United States Patent
Morita et al.

(10) Patent No.: US 6,445,539 B1
(45) Date of Patent: Sep. 3, 2002

(54) MAGNETIC TAPE CARTRIDGE WITH MAGNETIC TAPE LEADER PIN WHICH IS REMOVABLY HELD BY PIN HOLDING MEMBER

(75) Inventors: Kiyoo Morita; Daisuke Takahashi; Hideaki Shiga, all of Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/989,454

(22) Filed: Nov. 21, 2001

Related U.S. Application Data

(62) Division of application No. 09/826,855, filed on Apr. 6, 2001, now Pat. No. 6,356,411, which is a division of application No. 09/220,576, filed on Dec. 23, 1998, now Pat. No. 6,236,539.

(30) Foreign Application Priority Data

Dec. 24, 1997 (JP) .............................................. 9-354644
Apr. 28, 1998 (JP) ............................................ 10-118660

(51) Int. Cl.[7] ............................................ G11B 23/027
(52) U.S. Cl. .................................... 360/132; 242/348.2
(58) Field of Search ........................ 360/132; 242/332.4, 242/348.3, 348.2

(56) References Cited

U.S. PATENT DOCUMENTS

| | | | |
|---|---|---|---|
| 3,154,261 A | 10/1964 | Breuning | .................... 242/343 |
| 3,169,721 A | 2/1965 | Laa et al. | ................. 242/348.2 |
| 5,232,180 A * | 8/1993 | Hoge et al. | ............... 242/348.2 |
| 5,303,875 A | 4/1994 | Hoge et al. | ............... 242/348.3 |
| 5,465,187 A | 11/1995 | Hoge et al. | .................. 360/132 |
| 5,883,771 A | 3/1999 | Hoerger | ........................ 360/132 |
| 5,927,633 A | 7/1999 | McAllister | ................ 242/348.2 |
| 6,003,802 A * | 12/1999 | Eaton et al. | ............. 242/332.4 |

FOREIGN PATENT DOCUMENTS

| | | |
|---|---|---|
| DE | 92 17 315 | 4/1993 |
| EP | 0 062 171 | 10/1982 |
| EP | 0 398 671 | 11/1990 |
| EP | 0589 443 | 3/1994 |
| JP | 3-41681 | * 2/1991 |
| JP | 11-273306 | 10/1999 |
| NL | 281 598 | 12/1964 |
| WO | 83/04453 | 12/1983 |
| WO | 93/21634 | 10/1993 |

\* cited by examiner

Primary Examiner—Jefferson Evans
(74) Attorney, Agent, or Firm—Sughrue Mion, PLLC

(57) ABSTRACT

A magnetic tape cartridge includes a cartridge casing formed by upper and lower casing halves and a single reel around which a magnetic tape with a leader pin fixed to its leading end is wound and which is contained in the cartridge casing for rotation. A spring member removably holds upper and lower end portions of the leader pin on the cartridge casing. The spring member includes upper and lower holding portions which are respectively brought into abutment against the upper and lower end portions of the leader pin and are connected to each other.

6 Claims, 25 Drawing Sheets

F I G. 25A
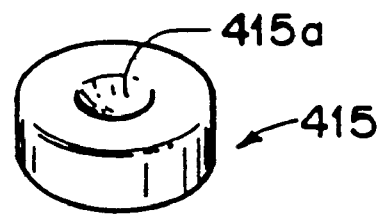
F I G. 25B
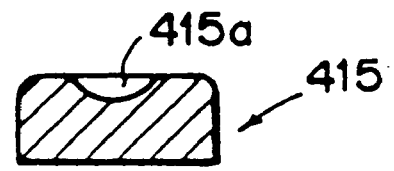
F I G. 26A
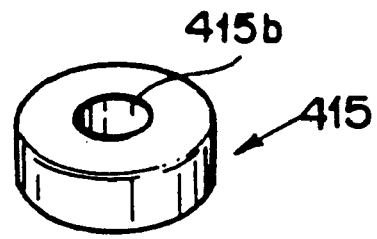
F I G. 26B
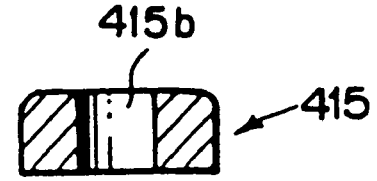

MAGNETIC TAPE CARTRIDGE WITH MAGNETIC TAPE LEADER PIN WHICH IS REMOVABLY HELD BY PIN HOLDING MEMBER

This is a divisional of application Ser. No. 09/826,855 now U.S. Pat. No. 6,356,411 filed Apr. 6, 2001, which is a divisional of application Ser. No. 09/220,576 (now U.S. Pat. No. 6,236,539) filed Dec. 23, 1998; the disclosure of which is incorporated herein by reference.

BACKGROUND OF THE INVENTION

1. Field of the Invention

This invention relates to a magnetic tape cartridge, and more particularly to a magnetic tape cartridge comprising a cartridge casing and a single reel around which a magnetic tape with a leader pin fixed to the leading end thereof is wound and which is contained in the cartridge casing for rotation.

2. Description of the Related Art

There has been known a single reel magnetic tape cartridge, comprising a cartridge casing and a single reel around which a magnetic tape is wound and which is contained in the cartridge casing for rotation, as a recording medium for an external storage for a computer and the like. Such a single reel magnetic tape cartridge is used for retaining important data of a computer or the like and accordingly is arranged so that trouble such as tape jamming does not occur and the magnetic tape is not accidentally drawn out.

A leader pin is fixed to the leading end of the magnetic tape and the tape drive system for recording and reproducing information on the magnetic tape is arranged to catch the leader pin and draw the magnetic tape into the tape drive system. When the tape is entirely taken up around the single reel, the leader pin is removably held on the cartridge casing. It is advantageous for the purpose of simplification of the structure to hold the leader on the cartridge casing by use of a spring member.

The leader pin has been fixed to the cartridge casing, which is generally of resin, by fusing a part of the cartridge casing. However, this method is troublesome and obstructive to increasing productivity. Further, when opposite ends of the leader pin are held by separate spring members, the number of parts increases and the man-hours required to assemble the magnetic tape cartridge increases, which adds to the cost.

SUMMARY OF THE INVENTION

In view of the foregoing observations and description, the primary object of the present invention is to provide a single-reel magnetic tape cartridge in which incorporation of the spring member for removably holding the leader pin is simplified and the number of parts is reduced.

The magnetic tape cartridge in accordance with the present invention comprises a cartridge casing formed by upper and lower casing halves, a single reel around which a magnetic tape with a leader pin fixed to the leading end thereof is wound and which is contained in the cartridge casing for rotation, and a spring member for removably holding upper and lower end portions of the leader pin on the cartridge casing, and is characterized in that the spring member comprises upper and lower holding portions which are respectively brought into abutment against the upper and lower end portions of the leader pin and are connected to each other.

It is preferred that the spring member be symmetrical about both its horizontal and vertical axes so that it may be incorporated in the cartridge casing in either of two directions.

The spring member may be further provided with a pressing portion which urges the leader pin in its axial direction.

The spring member is formed by a plate spring or a wire spring.

In accordance with the present invention, the opposite end portions of the leader pin can be held by a single spring member, which reduces the number of parts and contributes to reduction in cost. Further incorporation of the spring member is simplified and productivity is improved.

Especially when the spring member is symmetrical about both its horizontal and vertical axes, it may be incorporated in the cartridge casing in either of two directions and incorporation of the spring member is further simplified. Further when the spring member is further provided with a pressing portion which urges the leader pin in its axial direction, positioning the leader pin in place and stably holding the same can be realized by a single member, which further facilitates assembly of the magnetic tape cartridge.

BRIEF DESCRIPTION OF THE DRAWINGS

FIG. 25A is an enlarged perspective view showing the elastic member employed in the ninth embodiment.

FIG. 25B is an enlarged cross-sectional view of the elastic member,

FIG. 26A is an enlarged perspective view showing a modification of the elastic member, FIG. 26B is an enlarged cross-sectional view of the modification.

DESCRIPTION OF THE PREFERRED EMBODIMENTS

Figure 1:
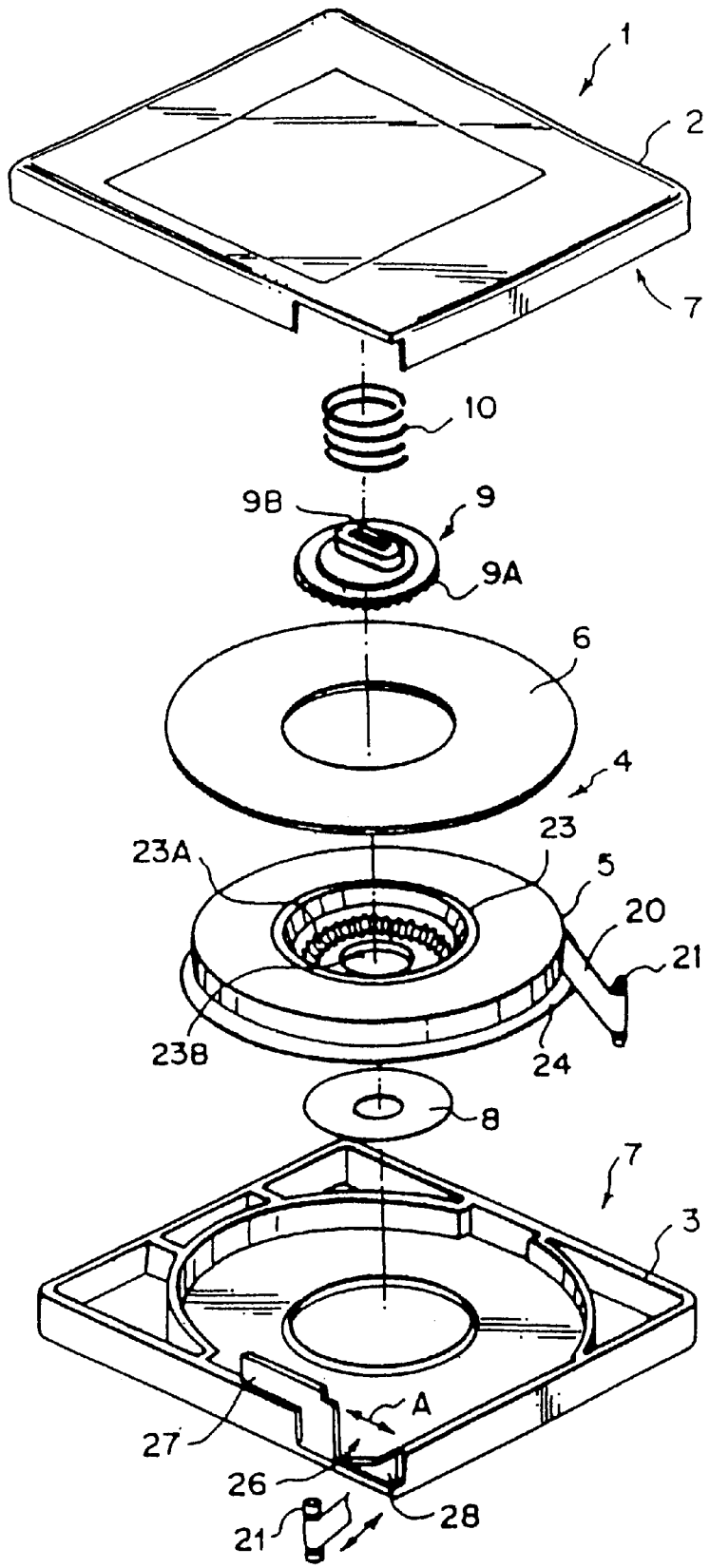
FIG. 1 is an exploded perspective view of a magnetic tape cartridge to which the present invention is applied.

In FIG. 1, a magnetic tape cartridge 1 comprises a single reel 4 around which a magnetic tape 20 is wound and is contained for rotation in a cartridge casing 7. The reel 4 is formed by bonding together a lower reel half 5 and an upper reel half 6 by ultrasonic welding. The cartridge casing 7 is formed by fastening together upper and lower casing halves 2 and 3 by screws and the like.

The lower reel half 5 comprises a cylindrical hub 23 and a flange 24 which are integrally molded from synthetic resin. A reel plate 8 for magnetically connecting a drive mechanism of a tape drive system (recording and reproducing system) is mounted on the outer bottom surface of the hub 23. Further on the inner bottom surface of the hub 23, is formed a stopper gear 23A which is brought into engagement with a brake gear 9A formed on a brake button 9 and prevents rotation of the reel 4 when the magnetic tape cartridge 1 is not used. The hub 23 is provided with an opening 23B, through which a brake release spindle in the tape drive system is inserted to push upward the brake button 9.

The brake button 9 is provided with said brake gear 9A at the lower end thereof and with a groove 9B at the upper end thereof. The groove 9B receives a guide projection (not shown) formed in the upper casing half 2. The brake button 9 is urged downward by a coiled spring 10 and is normally received in the hub 23, where the brake gear 9A and the stopper gear 23A are in mesh with each other to prevent rotation of the reel 4. When the magnetic tape cartridge 1 is loaded in the tape drive system, the brake release spindle of the tape drive system pushes upward the brake button 9, whereby the gears 9A and 23A are disengaged from each other to permit rotation of the reel 4.

A tape outlet opening 26 through which the magnetic tape 20 is drawn out is formed in a side wall of the cartridge casing 7. The tape outlet opening 26 is closed and opened by a slide door 27 which is slidable in the directions of double-headed arrow A and is urged in the closing position by a spring not shown.

A leader pin 21 is fixed to the leading end of the magnetic tape 20 and when the magnetic tape cartridge 1 is not used, the magnetic tape 20 is entirely wound around the reel 4 with the leader pin 21 held in a recess 28 formed near the tape outlet opening 26.

When the magnetic tape cartridge 1 is loaded in a tape drive system, the gears 23A and 9A of the hub 23 and the brake button 9 are disengaged from each other to permit rotation of the reel 4 in the manner described above and the drive mechanism of the tape drive system holds the reel plate 8 under magnetic force and rotates the reel 4. At the same time, the slide door 27 is opened and the leader pin 21 is brought to a predetermined position in a tape running path, thereby recording or reproduction becomes feasible.

The leader pin 21 is removably held in the recess 28 when the magnetic tape cartridge 1 is not used. This invention mainly relates to a pin holding structure for removably holding the leader pin 21 in the recess 28. Accordingly, in the following embodiments, the structure for removably holding the leader pin 21 in the recess 28 will be mainly described.

Figure 2:
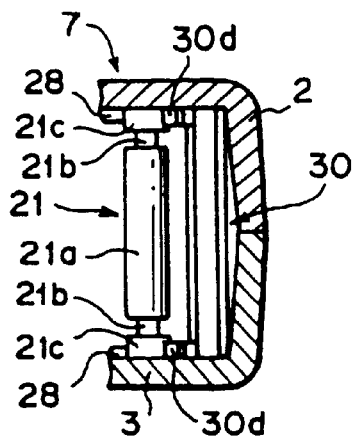
FIG. 2 is a fragmentary vertical cross-sectional view showing the part of the magnetic tape cartridge at which the spring member for removably holding the leader pin in accordance with a first embodiment is mounted.
Figure 3:
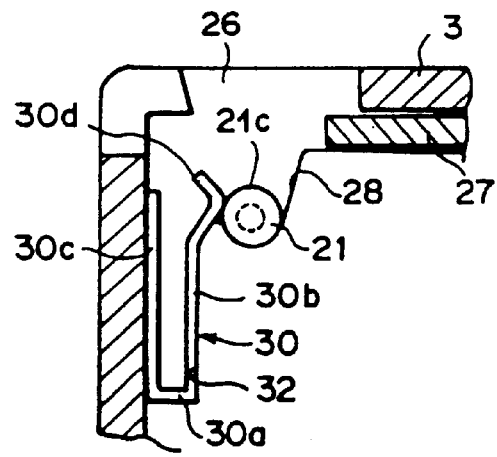
FIG. 3 is a fragmentary horizontal cross-sectional view of the same.
Figure 4:
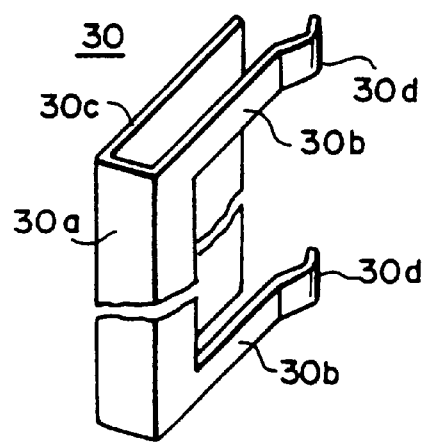
FIG. 4 is a perspective view of the spring member of the first embodiment.

In the first embodiment shown in FIGS. 2 to 4, the leader pin 21 comprises a central shaft portion 21a on which the leading end of the magnetic tape 20 is fixed, a pair of small diameter portions 21b on opposite sides of the shaft portion 21a and a pair of flanges 21c on the outer sides of the respective small diameter portions 21b. The tape drawing mechanism of the tape system catches the leader pin 21 at the small diameter portions 21b. The flanges 21c are retracted into the recess 28 formed in each of the upper and lower casing halves 2 and 3 and removably held there by a spring member 30 which is held in the cartridge casing 7 pinched between the upper and lower casing halves 2 and 3.

In this embodiment, the spring member 30 is formed of a plate spring and is symmetrical about the horizontal axis thereof as shown in FIG. 4. The spring member 30 is substantially U-shaped in plan and comprises a vertical base portion 30a, a back plate portion 30c which extends substantially perpendicular to the surface of the base portion 30a from one side of the base portion 30a, and upper and lower arms 30b which extend substantially in parallel to the back plate portion 30c from the other side of the base portion 20a spaced from each other in the vertical direction. A pin holding portion 30d is formed on the free end portion of each of the upper and lower arms 30b. The pin holding portion 30d has a rear inclined surface which extends from the free end of the arm 30b away from the back plate portion 30c and a front inclined surface which extends from the end of the rear inclined surface remote from the arm 30b and inclined toward the back plate portion 30c.

Each of the upper and lower portions of the spring member 30 is inserted into a recess 32 formed in each of the upper and lower casing halves 2 and 3 contiguously to the recess 28 with the pin holding portion 30d slightly projecting into the recess 28 as shown in FIG. 3. The spring member 30 is held in the recesses 32 by fastening together the upper and lower casing halves 2 and 3, whereby incorporation of the spring member 30 in the cartridge casing 7 is facilitated.

As the leader pin 21 is retracted inside, each of the flanges 21c is brought into abutment against the front inclined surface of the pin holding portion 30d and resiliently deforms the arm 30b toward the back plate portion 30c. Then as the flange 21c comes to contact with the rear inclined surface of the pin holding portion 30d, the arm 30b returns to its original position under its resiliency and the pin holding portion 30d holds the flange 21c of the leader pin 21 in the recess 28 under the resiliency of the arm 30b.

Figure 5:
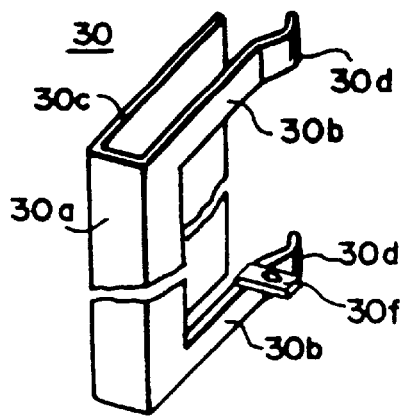
FIG. 5 is a perspective view showing a modification of the spring member of the first embodiment.

It is preferred that a rib 30f which is brought into abutment against the end face of the lower flange 21c of the leader pin 21 facing the small diameter portion 21b thereof be provided on the lower arm 30d as shown in FIG. 5 in order to more precisely positioning the leader pin 21 in the cartridge casing 7.

Figure 6:
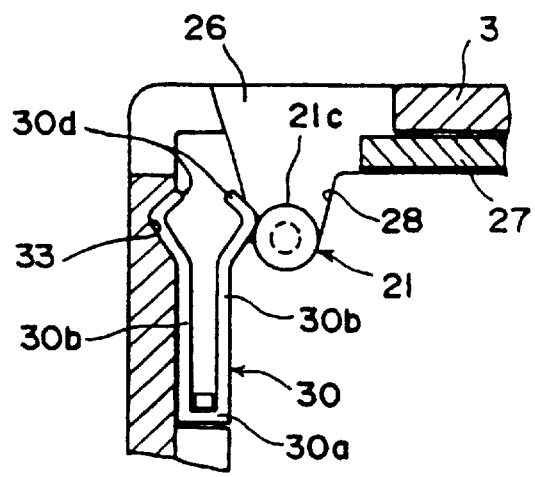
FIG. 6 is a fragmentary horizontal cross-sectional view showing the part of the magnetic tape cartridge at which the spring member in accordance with a second embodiment is mounted.
Figure 7:
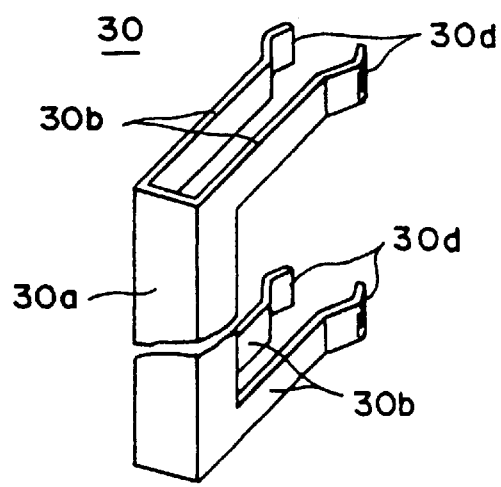
FIG. 7 is a perspective view of the spring member of the second embodiment.

In the second embodiment shown in FIGS. 6 and 7, the spring member 30 is basically the same as that in the first embodiment except that the spring member 30 in the second embodiment is symmetrical about both the horizontal and vertical axes.

That is, in the second embodiment, upper and lower arms 30b and upper and lower holding portions 30d which are the same as those shown in FIG. 4 in shape are provided in place of the back plate portion 30c as shown in FIG. 7.

The upper and lower holding portions 30d which are not brought into contact with the leader pin 21 are received in recesses 33 formed in the upper and lower casing halves 2 and 3 as shown in FIG. 6.

In this embodiment, the spring member 30 may be incorporated in the cartridge casing 1 in either of two directions and incorporation of the spring member is further simplified.

Also in this embodiment, it is preferred that a rib 30f which is brought into abutment against the end face of the lower flange 21c of the leader pin 21 facing the small diameter portion 21b thereof be provided on the lower arm 30d as in the first embodiment.

Figure 8:
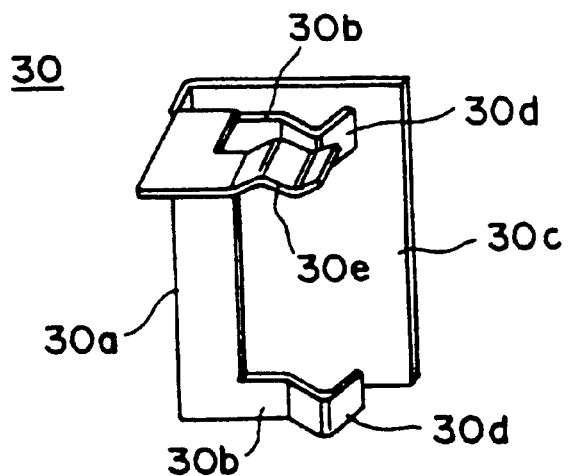
FIG. 8 is a perspective view of the spring member of a third embodiment.

In the third embodiment shown in FIG. 8, the spring member 30 is basically the same as that in the first embodiment except that the spring member 30 in the third embodiment is further provided with a pressing portion 30e above the upper holding portion 30d.

The pressing portion 30e is formed on an L-shaped portion which laterally extends from the upper edge of the upper arm 30b and then bent forward to extend in parallel to the arm 30b. The pressing portion 30e has a free end portion inclined upward and a base portion recessed upward and is brought into abutment against the upper end face of the upper flange 21c of the leader pin 21 to urge downward the leader pin 21 in the axial direction of the leader pin 21. The pin holding portions 30d hold the leader pin 21 in the recesses 28 and the pressing portion 30e positions the leader pin 21 in the vertical direction, thereby more precisely positioning the leader pin 21 in the cartridge casing 7.

Figure 9:
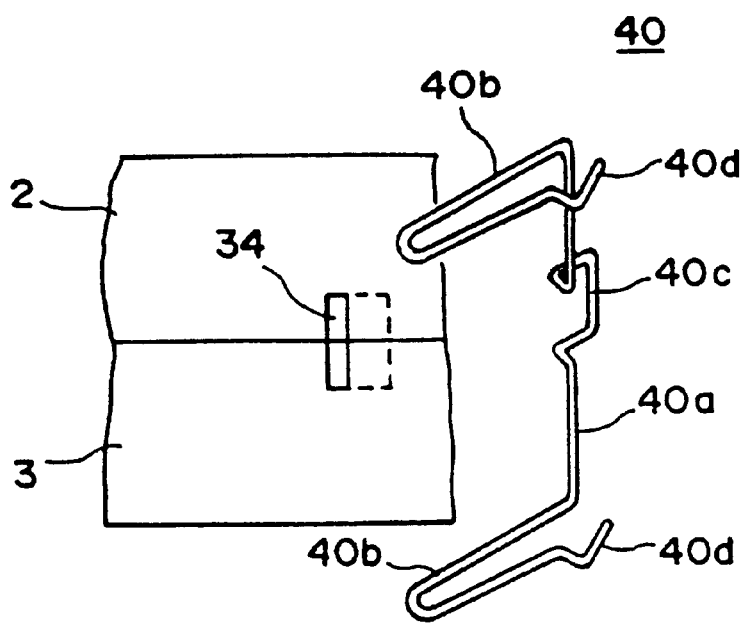
FIG. 9 is a perspective view of a spring member in accordance with a fourth embodiment of the present invention.
Figure 10:
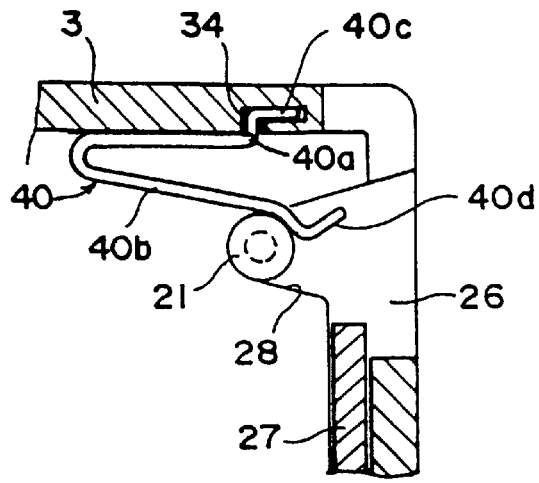
FIG. 10 is a fragmentary horizontal cross-sectional view showing the part of the magnetic tape cartridge with the spring member of the fourth embodiment incorporated therein.

In the fourth embodiment shown in FIGS. 9 and 10, the spring member 40 is formed by a wire spring and comprises a vertical base portion 40a, upper and lower arms 40b which extend rearward from upper and lower ends of the base portion 40a and are sharply bent forward like a hair pin and upper and lower pin holding portions 40d which are formed on the free end portions of the upper and lower arms 40b. The pin holding portion 40d has a rear inclined portion and a front inclined portion and is shaped like the cross-section of the pin holding portion 30d in the first embodiment.

A mounting portion 40c is formed in the middle portion of the base portion 40a bent in the direction opposite to the arms 40b. The mounting portion 40c is inserted into an L-shaped groove 34 formed in the upper and lower casing halves 2 and 3 at the portion where they butt against each other. The spring member 40 is symmetrical about its horizontal axis as can be seen from FIG. 9.

As the leader pin 21 is retracted inside, each of the flanges 21c is brought into abutment against the front inclined surface of the pin holding portion 40d and resiliently deforms the arm 40b. Then as the flange 21c comes to contact with the rear inclined surface of the pin holding portion 40d, the arm 40b returns to its original position under its resiliency and the pin holding portion 40d holds the flange 21c of the leader pin 21 in the recess 28 under the resiliency of the arm 40b.

When incorporating the spring member 40, the spring member 40 is first placed on one of the casing halves 2 and 3 with the mounting portion 40c inserted into the groove 34 in the casing half and then the casing halves 2 and 3 are fastened together. Since the upper and lower holding portions 40d are connected, incorporation of the spring member 40 is facilitated.

Figure 11:
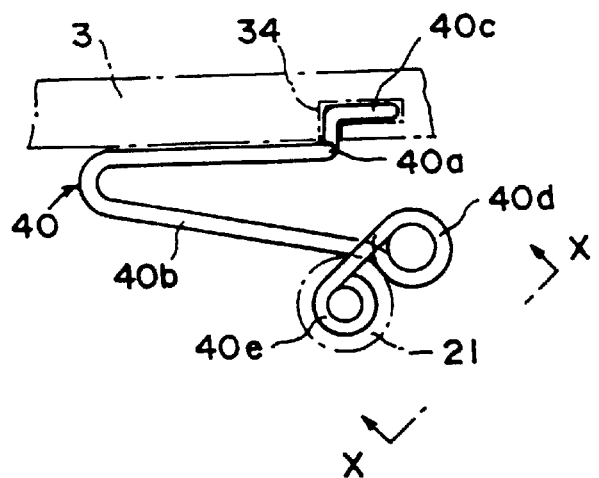
FIG. 11 is a plan view of the spring member of a fifth embodiment.
Figure 12:
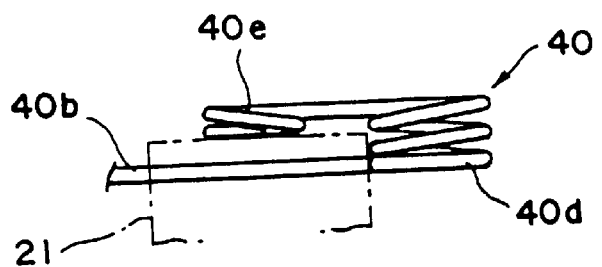
FIG. 12 is a view as seen in the direction of arrow X in FIG. 11.

In the fifth embodiment shown in FIGS. 11 and 12, the spring member 40 is basically the same as that in the fourth embodiment except that the spring member 40 in the fourth embodiment is further provided with a pressing portion 40e above the upper holding portion 40d.

In this embodiment, the upper holding portion 40d is formed by winding the arm portion 40b and the pressing portion 40e is formed by winding an extension of the holding portion 40d into a ring. The pressing portion 40e has downward resiliency and is brought into abutment against the upper end face of the leader pin 21 to urge downward the leader pin 21 in its axial direction.

Figure 13:
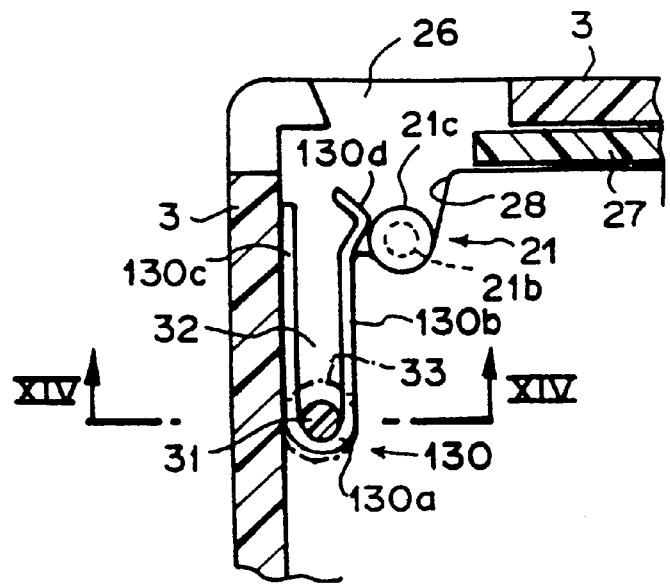
FIG. 13 is a fragmentary horizontal cross-sectional view showing a pin holding structure in a magnetic tape cartridge in accordance with a sixth embodiment of the present invention.
Figure 14:
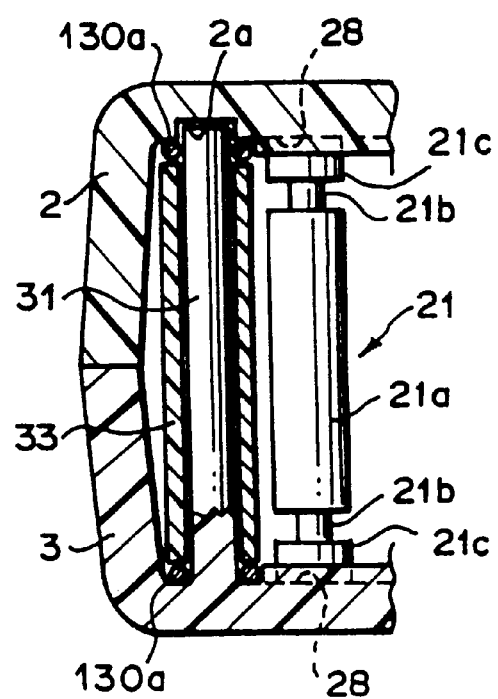
FIG. 14 is a cross-sectional view taken along line XIV—XIV in FIG. 13.
Figure 15:
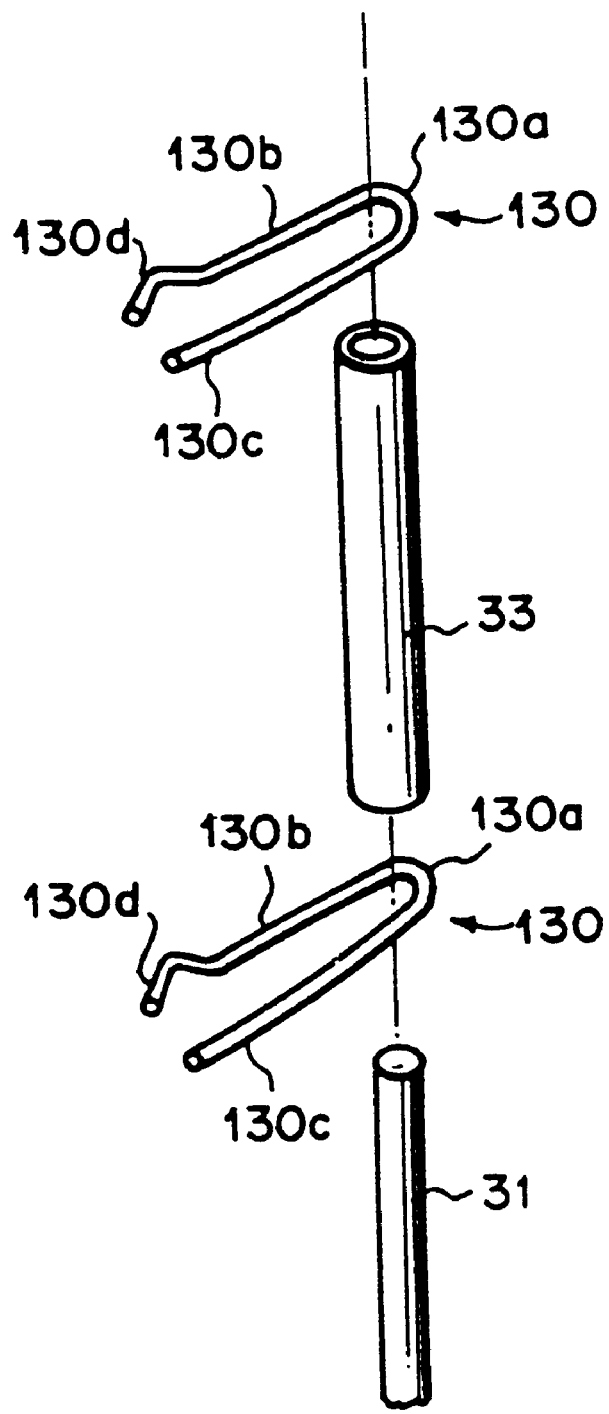
FIG. 15 is an exploded perspective view for illustrating a method of incorporating spring members in the cartridge casing.

In the sixth embodiment shown in FIGS. 13 to 15, the upper and lower flanges 21c are held by a pair of spring members 130 which are separate from each other and identical to each other in shape. Each spring member 130 is formed by a plate spring or a wire spring and is similar to the arm 40b and the holding portion 40d in the spring member 40 shown in FIG. 9 in shape and function.

That is, the spring member 130 is substantially Ushaped and comprises a bight portion 130a, a pair of arms 130b and 130c extending substantially in parallel to each other from opposite ends of the bight portion 130a and a pin holding portion 130d formed on the free end of the arm 130c. The bight portion 130a has an inner diameter substantially equal to the outer diameter of a support pin to be described later. The pin holding portion 130d has a rear inclined portion and a front inclined portion similarly to the holding portion 40d in the spring member 40 shown in FIG. 9.

A support pin 31 is erected on the upper surface of the lower casing half 3 in a height substantially equal to the space between the lower surface of upper casing half 2 and the upper surface of the lower casing half 3 so that the top end face of the support pin 31 is in contact with or slightly short of the lower surface of the upper casing half 2. It is preferred that the upper end of the support pin 31 be received in a circular recess 2a as shown in FIG. 14. Each of the upper and lower spring members 130 is inserted into a recess 32 formed in each of the upper and lower casing halves 2 and 3 around the support pin 31 contiguously to the recess 28.

As shown in FIG. 15, when the spring members 130 are incorporated in the cartridge casing 7, a spring member 130 is fitted on the support pin 31 so that the bight portion 130a is positioned on the base of the support pin 31 and the spring member 130 is inserted into the recess 32. Then spacer tube 33 having a predetermined length is fitted on the support pin 31 so that its lower end face rests on the bight (i.e., bent) portion 130a of the spring member 130 and another spring member 130 is fitted on the support pin 31 so that the bight portion 130a rests on the upper end face of the spacer tube 33. Then after the upper spring member 130 is caused to extend in the same direction as the lower spring member 130, the upper casing half 2 is fastened to the lower casing half 3.

The sum of the thicknesses of the bight portions 130a of the upper and lower spring members 130 and the length of the spacer tube 33 is selected to be slightly smaller than the space between the inner surfaces of the upper and lower casing halves 2 and 3 at the portion where the support pin 31 is formed, whereby the spring members 130 and the spacer tube 33 can be surely held between the upper and lower casing halves 2 and 3 without deforming the casing halves 2 and 3.

In this embodiment, only one of the upper and lower spring members 130 may be provided, if desired.

Figure 16:
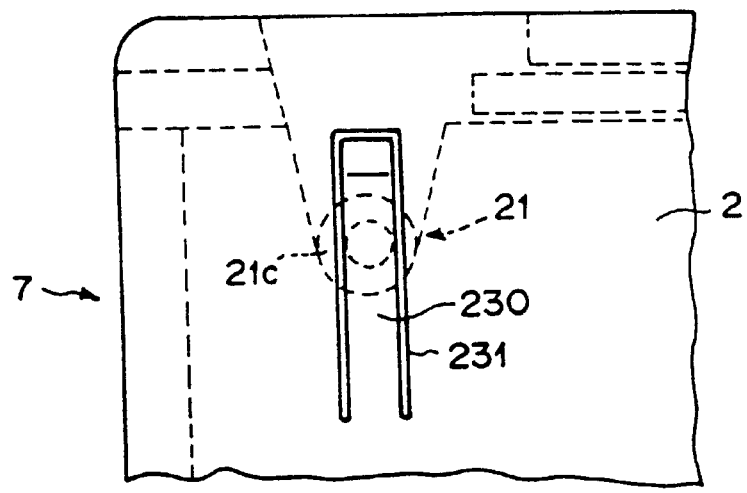
FIG. 16 is a fragmentary plan view showing a pin holding structure in a magnetic tape cartridge in accordance with a seventh embodiment of the present invention.
Figure 17:
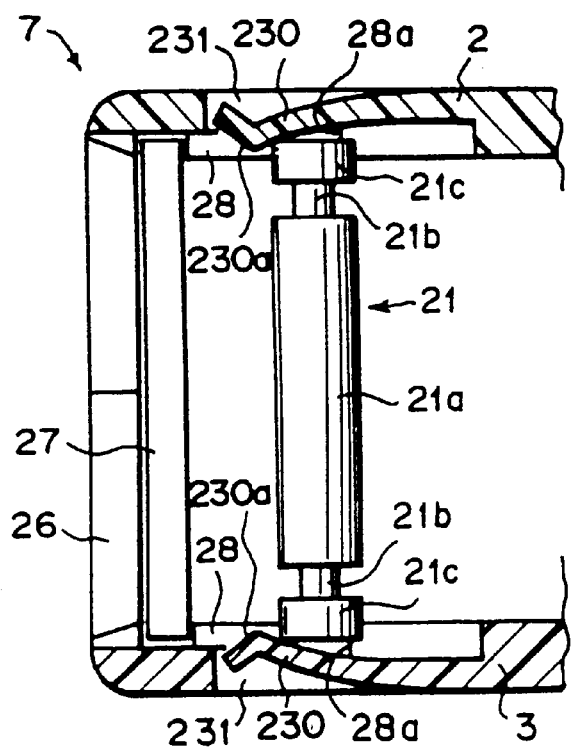
FIG. 17 is a vertical cross-sectional view of the pin holding structure shown in FIG. 16.

In the seventh embodiment shown in FIGS. 16 and 17, the leader pin 21 is removably held by a pair of spring members formed integrally with the upper and lower casing halves 2 and 3. That is, each of the upper and lower casing halves 2 and 3 is provided with a channel-shaped slit 231 and a cantilever arm (spring member) 230 extending toward the tape outlet opening 26 is formed on each of the upper and lower casing halves 2 and 3. A pin holding portion 230a which is convex inward (convex downward in the case of the upper spring member 230 and upward in the case of the lower spring member 230) and has a front inclined surface inclined upward toward the tape outlet opening and a rear inclined surface inclined upward away from the tape outlet opening is formed on the free end of the spring member 230. The spring members 230 are resilient. As the leader pin 21 is retracted inside, each of the flanges 21c is brought into abutment against the front inclined surface of the pin holding portion 230a and resiliently deforms the cantilever arm 230. Then as the flange 21c comes to contact with the rear inclined surface of the pin holding portion 230a, the cantilever arm 230 returns to its original position under its resiliency and the pin holding portion 230a holds the flange 21c of the leader pin 21 in the recess 28 under the resiliency of the cantilever arm 230 as shown in FIG. 17.

Figure 18:
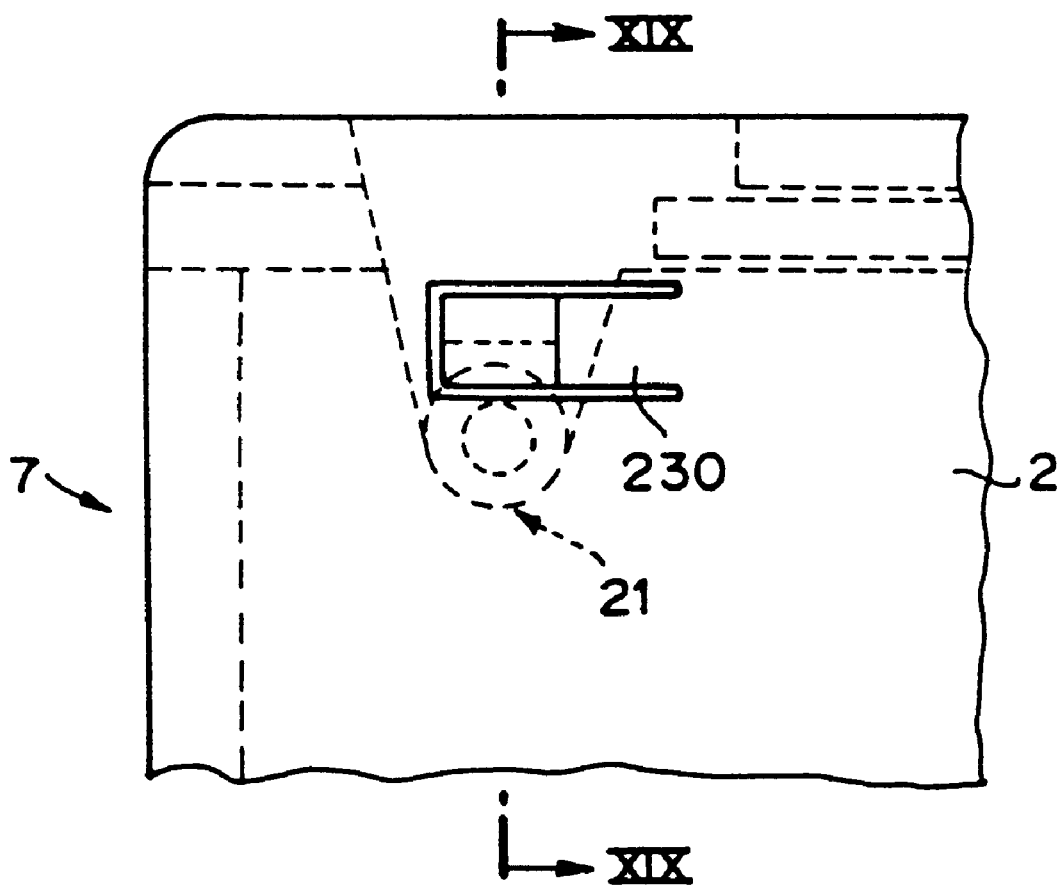
FIG. 18 is fragmentary plan view showing a modification of the pin holding structure of the seventh embodiment.
Figure 19:
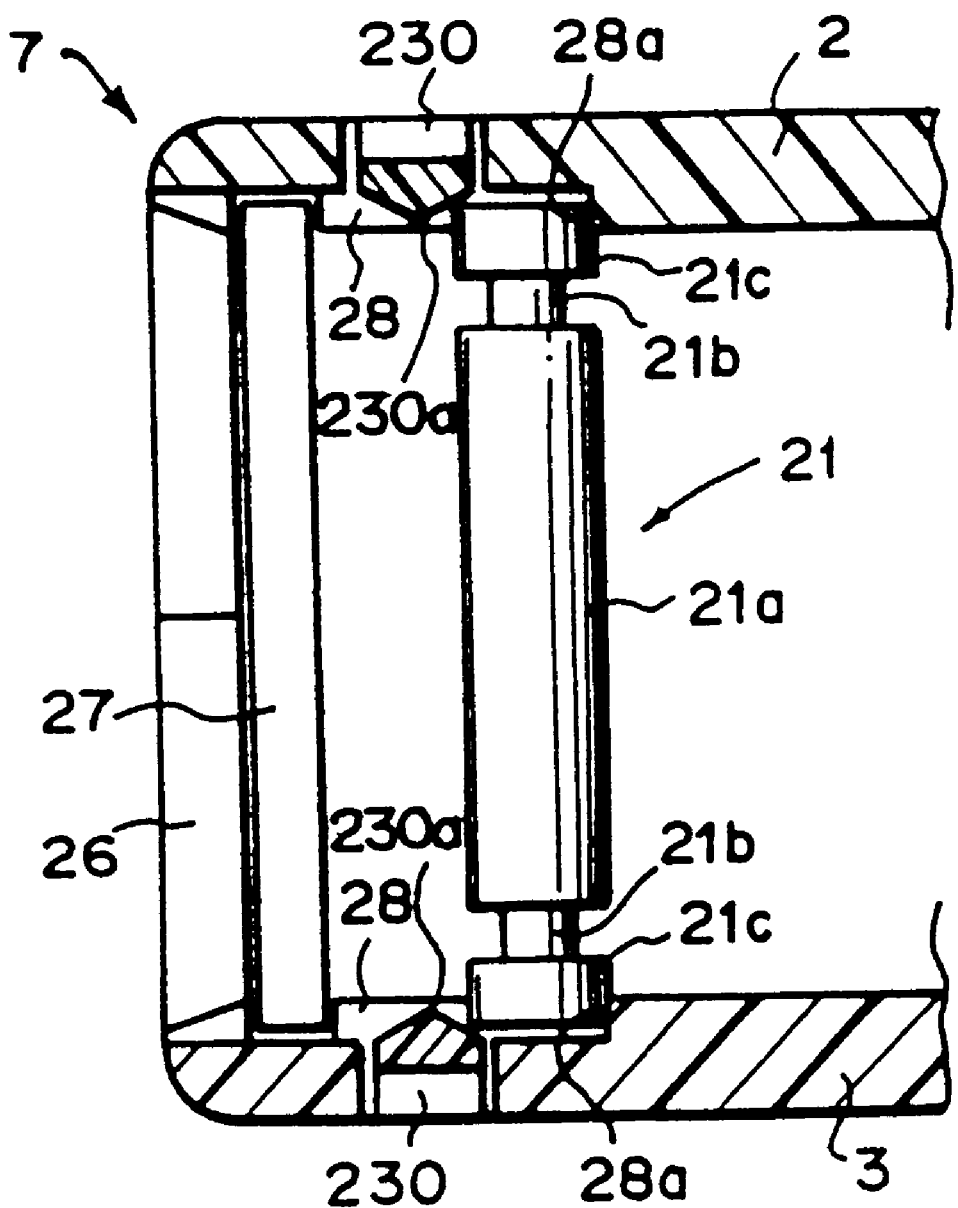
FIG. 19 is a vertical cross-sectional view of the modification shown in FIG. 18.

Though in the seventh embodiment, the cantilever arms 230 extend in the direction of movement of the leader pin 21, they may be formed to extend in a direction transverse to the direction of movement of the leader pin 21 as shown in FIGS. 18 and 19. In this case, each of the pin holding portions 230a has front and rear inclined surfaces inclined in the transverse direction of the cantilever arm 230 as clearly shown in FIG. 19.

Figure 20:
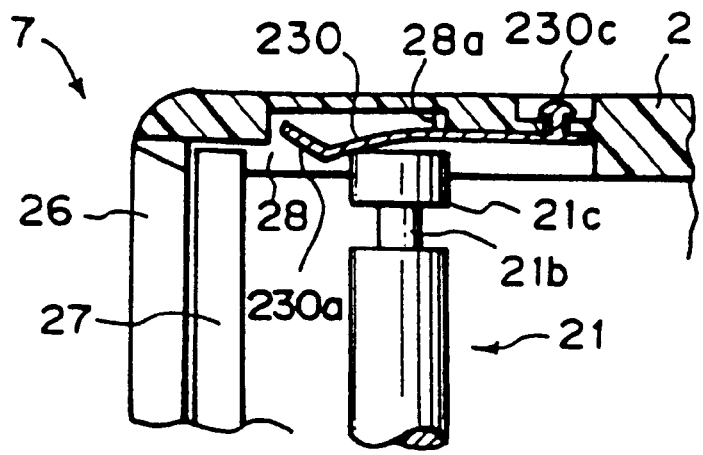
FIG. 20 is a vertical cross-sectional view showing another modification of the pin holding structure of the seventh embodiment.

Further though in the seventh embodiment, the spring members 230 are formed integrally with the upper and lower casing halves 2 and 3, they may be formed separately from the casing halves 2 and 3 as shown in FIG. 20. In FIG. 20, the spring member 230 is formed by a spring plate of plastic or metal separately from the casing halves and is fixed to the casing half by caulking a projection 230c on the base portion thereof.

Figure 21:
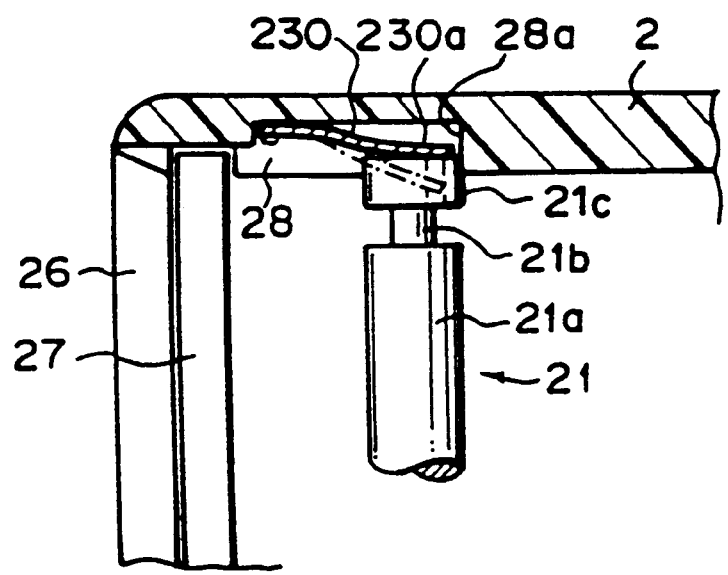
FIG. 21 is a vertical cross-sectional view showing still another modification of the pin holding structure of the seventh embodiment.

Though in the modification shown in FIG. 20, the spring member 230 are fixed to the cartridge casing with their free ends directed toward the tape outlet opening 26, they may be fixed to the cartridge casing with their free ends directed away from the tape outlet opening 26 as shown in FIG. 21. In this case, the holding portion 230a need not be provided with a rear inclined surface and the flange 21c is positioned by the bottom surface 28a of the recess 28.

Figure 22:
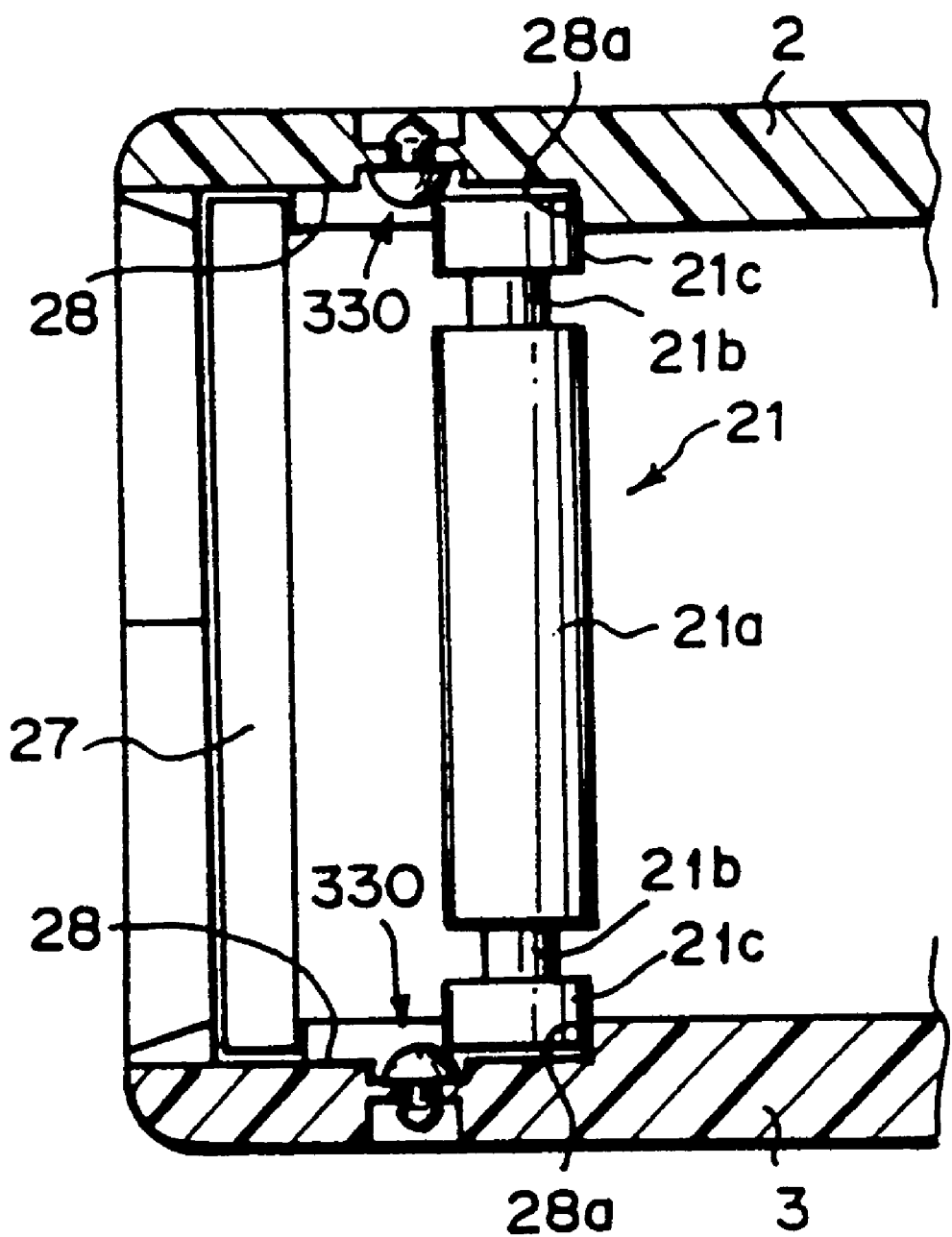
FIG. 22 is a fragmentary vertical cross-sectional view showing a pin holding structure in a magnetic tape cartridge in accordance with an eighth embodiment of the present invention.
Figure 23:
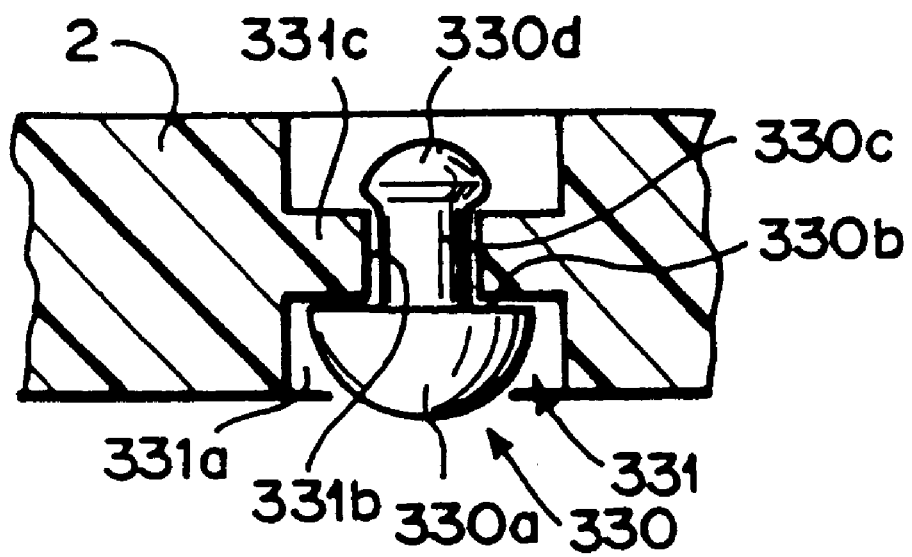
FIG. 23 is an enlarged cross-sectional view of a part of the pin holding structure shown in FIG. 22.

In the eighth embodiment shown in FIGS. 22 and 23, the leader pin 21 is held by a pair of pin holding members 330 which are formed of elastic plastic and mounted respectively on the lower surface of the upper casing half 2 and the upper surface of the lower casing half 3. As shown in FIG. 23, the pin holding member 330 comprises a semi-spherical holding portion 330a having a flat rear surface 330b, a stem 330c extending from the center of the flat rear surface 330b and an increased diameter portion 330d formed on the tip of the stem 330c.

Each of the upper and lower casing halves 2 and 3 is provided with a through hole 331 extending through the casing half. The inner portion 331 a of the through hole 331 has an inner diameter smaller than the outer diameter of the holding portion 330a. A shoulder portion 331c having a central hole 331b of a smaller diameter is formed at a middle portion of the through hole 331. The pin holding member 330 is mounted on the casing half by press-fitting the increased diameter portion 330d on the tip of the step 330c into the central hole 331b so that the increased diameter portion 330d rests on the outer surface of the shoulder portion 331c and the rear surface 330b of the holding portion 330a rests on the inner surface of the shoulder portion 331c. In this state, the spherical surface of the holding portion 330a projects inward from the inner surface of the casing half by a predetermined amount.

As the leader pin 21 is retracted inside, each of the flanges 21c is brought into abutment against the spherical surface of each holding portion 330a and the holding portion 330a is resiliently deformed, thereby permitting the flange 21c to pass the holding portion 330a. Then when the flange 21c comes to contact with the bottom surface 28a of the recess 28, the holding portion 330a returns to its original position under its resiliency and holds the flange 21c of the leader pin 21 in the recess 28 as shown in FIG. 22.

Figure 24:
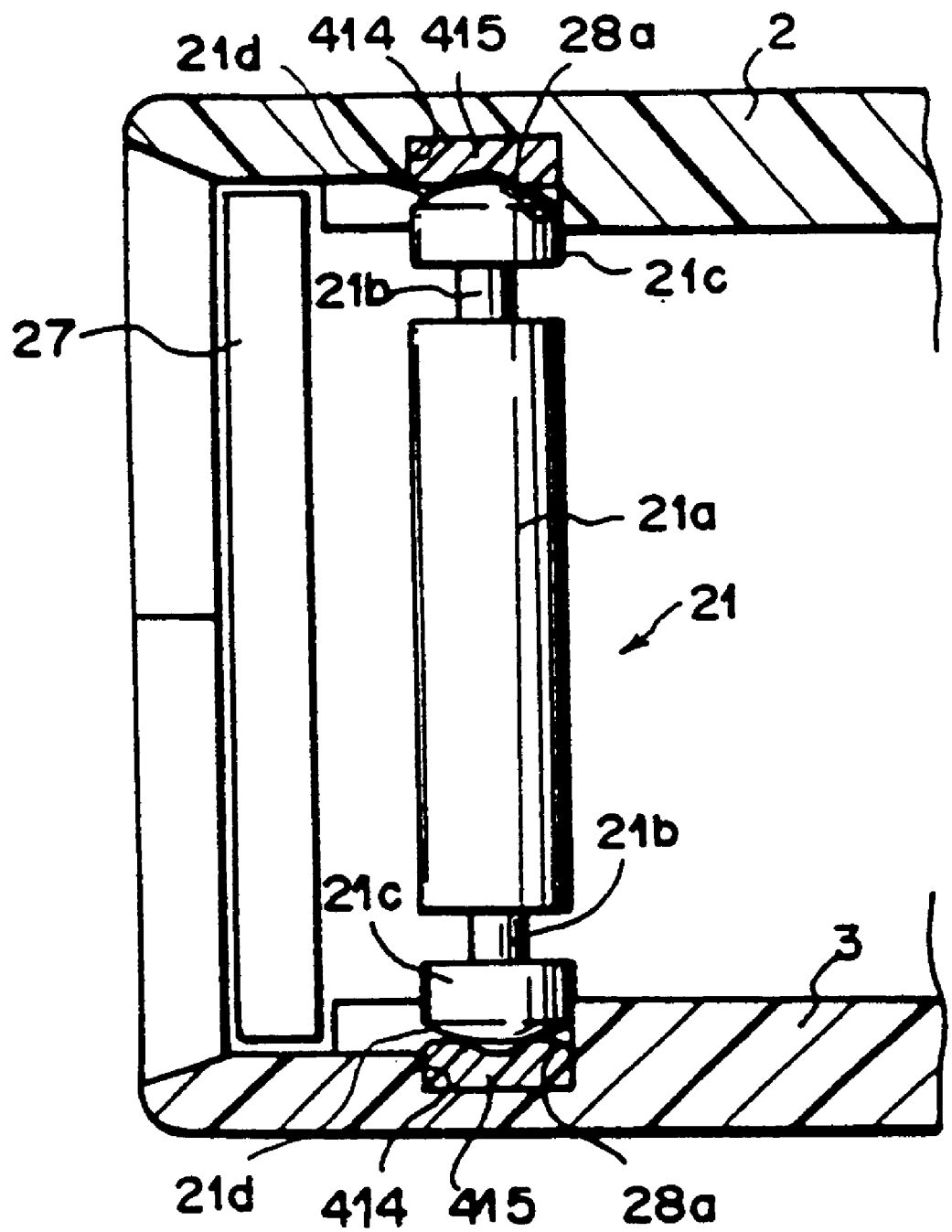
FIG. 24 is a fragmentary vertical cross-sectional view showing a pin holding structure in a magnetic tape cartridge in accordance with a ninth embodiment of the present invention.

In the ninth embodiment shown in FIG. 24, the leader pin 21 is held by a pair of elastic members 415 provided on the lower surface of the upper casing half 2 and the upper surface of the lower casing half 2. In this embodiment, each of the upper and lower flanges 21c is provided with a spherical end face 21d. Each elastic member 415 is held in a recess 414 formed in the inner surface of the casing half by press-fitting the elastic member 415 in the recess 414 or bonding the same to the recess 414.

The elastic member 415 is formed of natural rubber, synthetic rubber, polyoxymethylene, polyamide or the like, and is provided with a recess 415a on its inner surface as shown in FIGS. 25A and 25B. When the leader pin 21 is retracted into the recess 28 and each flange 21c is brought into abutment against the elastic member 415, the elastic member 415 is resiliently deformed to permit the spherical end face 21d into engagement with the recess 415a, thereby holding the leader pin 21 in the recess 28.

The elastic member 415 may be provided with a hole 415b in place of the recess 415a as shown in FIGS. 26A and 26B.

The elastic member 415 may be provided on only one of the upper and lower casing halves 2 and 3.

Figure 27:
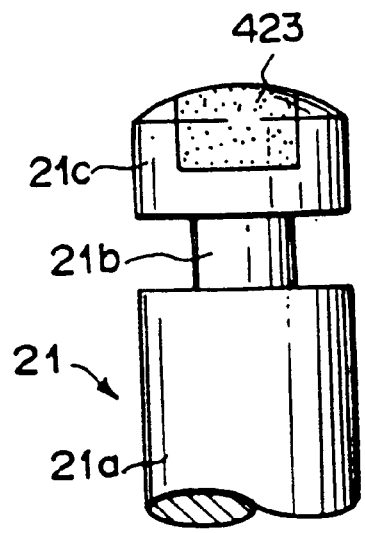
FIG. 27 is a fragmentary side view showing a leader pin employed in a magnetic tape cartridge in accordance with a tenth embodiment of the present invention.

In the tenth embodiment shown in FIG. 27, the leader pin 21 us removably held in the recess 28 under the resiliency of an elastic member 423 provided on at least one of the flanges 21c. The elastic member 423 is fixed to the flange 21c, for instance, by press-fitting the elastic member 423 in a recess formed on the flange 21c.

Figure 28:
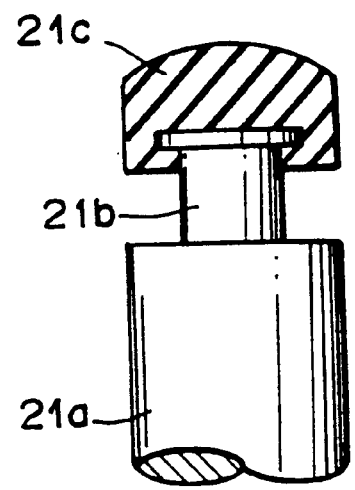
FIG. 28 is a fragmentary side view showing a modification of the leader pin shown in FIG. 27, FIGS. 29A and 29B are fragmentary side views showing a leader pin employed in a magnetic tape cartridge in accordance with an eleventh embodiment of the present invention.

The flange 21c may be entirely formed of elastic material as shown in FIG. 28.

Figure 29A:
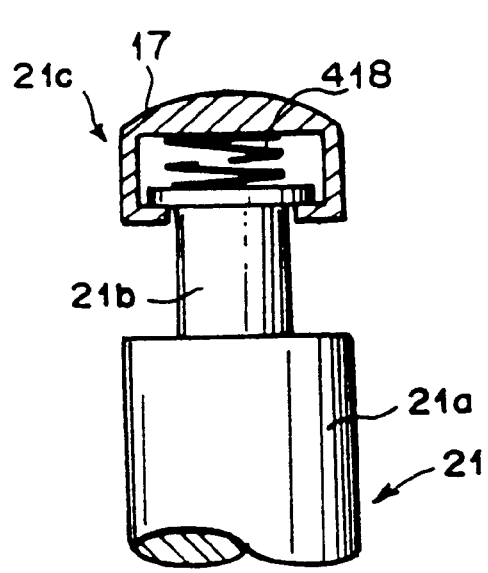
Figure 29B:
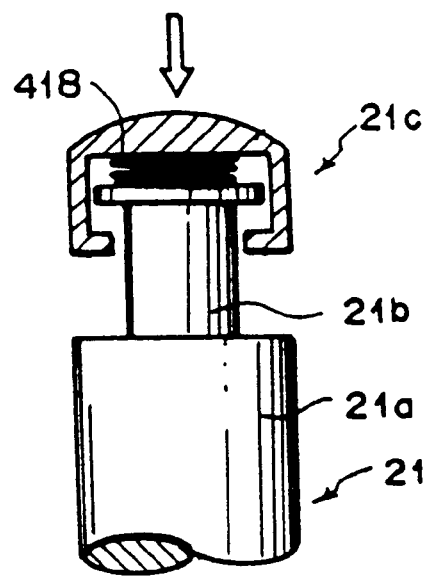
Figure 30:
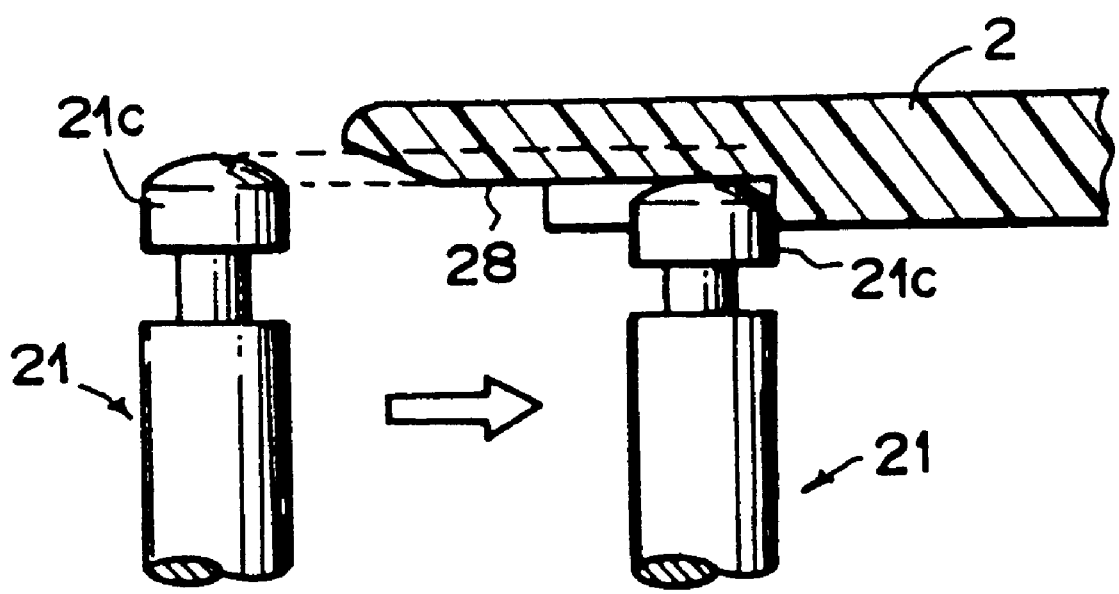
FIG. 30 is a fragmentary side view partly in cross-section for illustrating the operation of the leader pin.

In the eleventh embodiment shown in FIGS. 29A, 29B and 30, the leader pin 21 is provided with a flange 21c which is movable in the axial direction of the leader pin 21 and is urged outward by a coiled spring 418 disposed between the small diameter portion 21b and the flange 21c.

As shown in FIG. 30, the space between the upper and lower recesses 28 in the cartridge casing 7 is slightly smaller than the length of the leader pin 21, and as the leader pin 21 is retracted into the recesses 28, the end faces of the flanges 21c are moved toward each other compressing the coiled springs 418 and the leader pin 21 is held in the recesses 28 by resiliency of the coiled springs 418.

Figure 31:
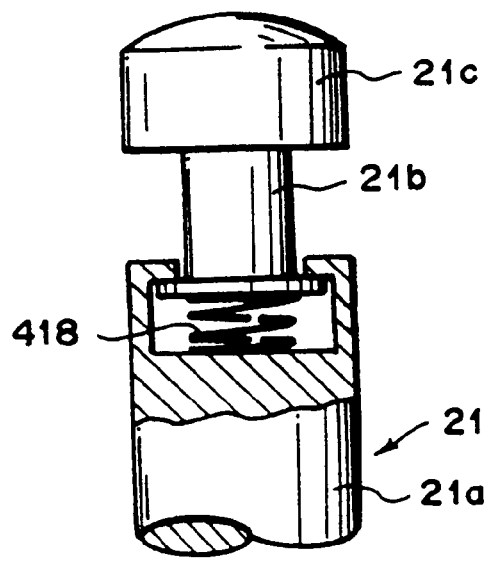
FIG. 31 is a fragmentary side view showing a modification of the leader pin shown in FIGS. 29A and 29B, FIGS. 32A and 32B are fragmentary cross-sectional views for illustrating the operation of the pin holding structure in accordance with a twelfth embodiment of the present invention.

Though in the eleventh embodiment, the coiled spring 418 is disposed between the flange 21c and the small diameter portion 21b, the coiled spring 418 may be provided between the shaft portion 21a and the smaller diameter portion 21b which is movable together with the flange 21c in the axial direction relative to the shaft portion 21a as shown in FIG. 31.

Figures 32A, 32B:
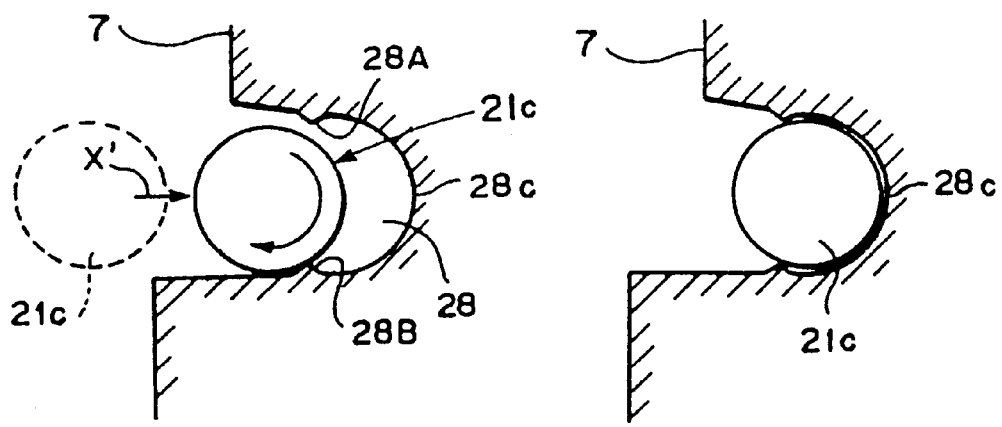

In the twelfth embodiment shown in FIGS. 32A and 32B, the flange 21c is mounted for rotation on the smaller diameter portion 21b. Each of the upper and lower recesses 28 comprises a semi-spherical wall surface 28C which has a radius slightly larger than that of the flange 21c and a pair of projections 28A and 28B projecting inward at the entry to the recess 28. When the leader pin 21 is retracted into the recess 28 in the direction of arrow X, the flange 21c of the leader pin 21 is brought into abutment against the projections 28A and 28B and is brought into engagement with the semi-spherical wall surface 28C resiliently deforming the projections 28A and 28B to be removably held there by the projections 28A and 28B. At this time, generally the flange 21c is first brought into abutment against one of the projections 28A and 28B, e.g., the projection 28B and then is brought into abutment against the other, e.g., the projection 28A, and the flange 21c is seldom brought into abutment against both the projections 28A and 28B simultaneously. When the flange 21c is first brought into abutment against the projection 28B, a turning moment is applied to the flange 21c in the direction of the arrow due to friction between the flange 21c and the projection 28B.

When the flange 21c is not able to rotate relative to the small diameter portion 21b, the turning moment acts on the whole leader pin 21 as torsional moment and adversely affect the position of the leader pin 21, which prevents the flange 21c from being smoothly brought into engagement with recess 28. To the contrast, in this embodiment, since the flange 21c is rotatable relative to the small diameter portion 21b, the turning moment is absorbed by rotation of the flange 21c and does not adversely affect the position of the leader pin 21.

The flange 21c may be mounted for rotation on the smaller diameter portion 21b in various ways.

Figure 33A:
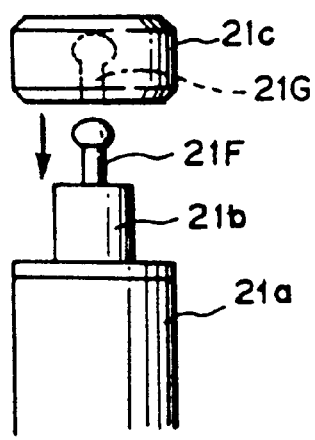
FIG. 33A is an exploded side view for illustrating an example of the joint for rotatably connecting the flange to the small diameter portion.
Figure 33B:
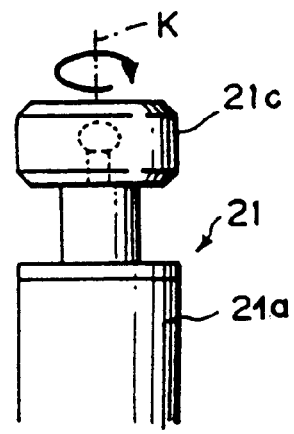
FIG. 33B is a side view of the joint in the assembled state.
Figure 34A:
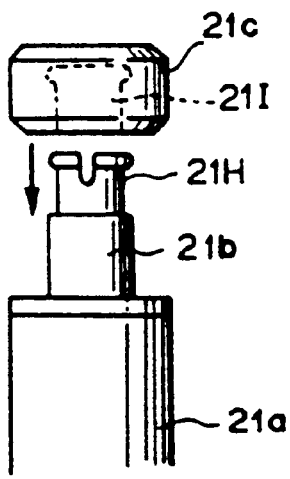
FIG. 34A is an exploded side view for illustrating another example of the joint for rotatably connecting the flange to the small diameter portion.
Figure 34B:
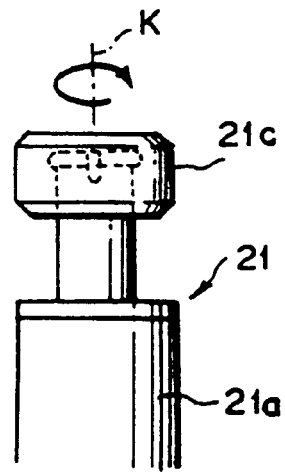
FIG. 34B is a side view of the joint in the assembled state.
Figure 35A:
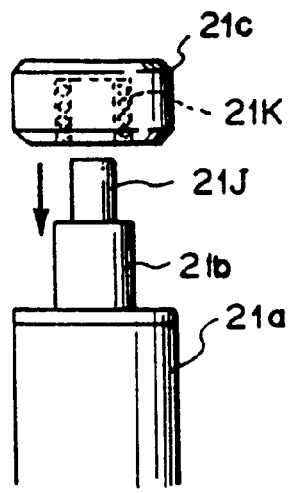
FIG. 35A is an exploded side view for illustrating still another example of the joint for rotatably connecting the flange to the small diameter portion.
Figure 35B:
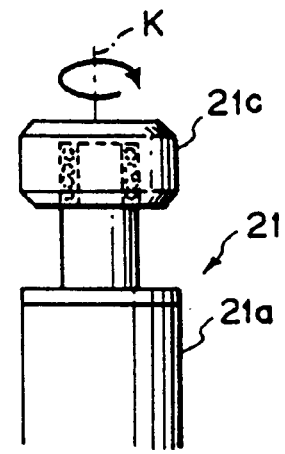
FIG. 35B is a side view of the joint in the assembled state.

For example, as shown in FIGS. 33A and 33B, a joint 21F which comprises a ball of elastic material formed on one end of a shaft portion and fixed to the free end of the small diameter portion 21c may be press-fitted in a socket 21G, which is formed in the flange 21c and conforms to the joint 21F in shape, to be rotatable about the longitudinal axis K. Otherwise a joint 21H comprising shaft like member which is provided with an enlarged tip and a slit and fixed to the free end of the small diameter portion 21b may be press-fitted in a socket 21I, which is formed in the flange 21c and conforms to the joint 21H in shape, to be rotatable about the longitudinal axis K as shown in FIGS. 34A and 34B. Otherwise a straight shaft 21J fixed to the free end of the small diameter portion 21b may be fitted in a miniaturized bearing 21K provided in the flange 21c as shown in FIGS. 35A and 35B.

Figure 36:
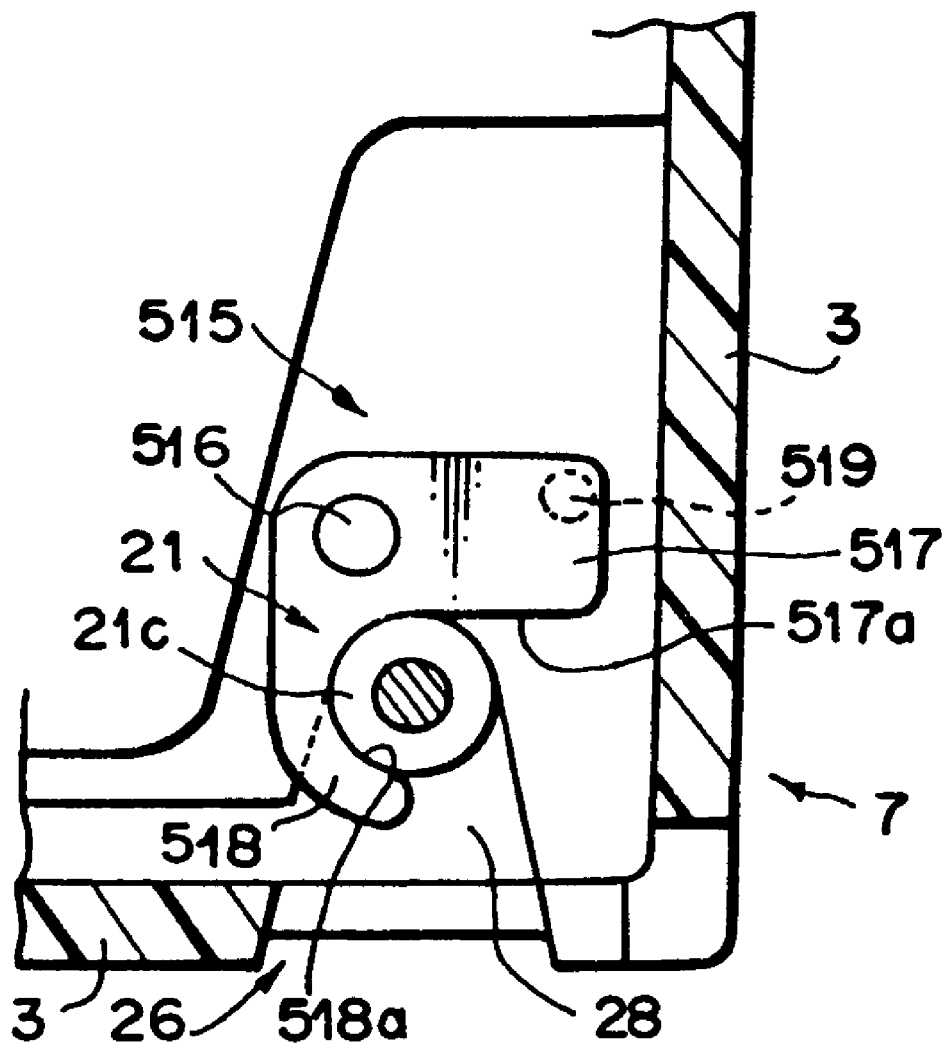
FIG. 36 is a fragmentary cross-sectional view of an important part of the magnetic tape cartridge in accordance with a thirteenth embodiment of the present invention with the pin holding member in the second position.
Figure 37:
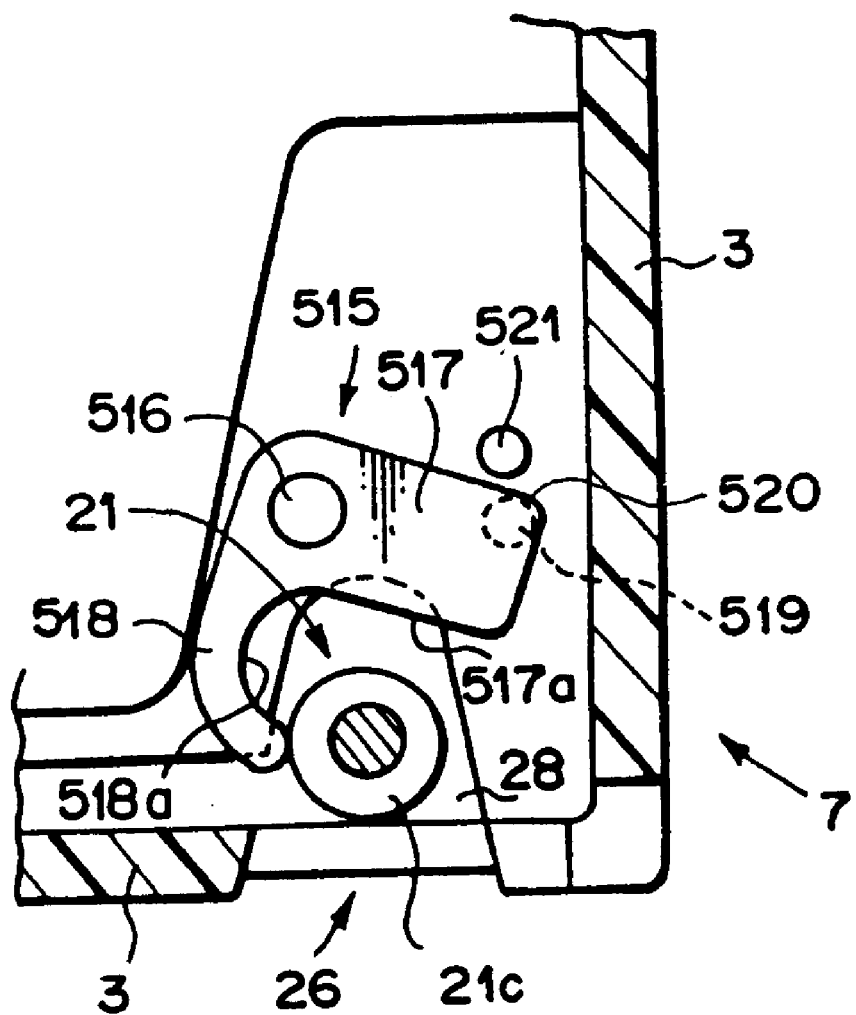
FIG. 37 is a view similar to FIG. 36 but with the pin holding member in the first position.

In the thirteenth embodiment shown in FIGS. 36 and 37, the leader pin 21 is removably held in the recesses 28 formed in the upper and lower casing halves 2 and 3 by a pin holding member 515 disposed in each recess 28.

That is, as shown in FIGS. 36 and 37, the pin holding member 515 is an L-shaped lever having a straight first arm 517 and an arcuate second arm 518 and is supported for rotation on a shaft 516 between a first position shown in FIG. 37 and a second position shown in FIG. 36.

In the first position, the second arm 518 is to retracted from the recess 28 to permit the leader pin 21 to be moved into and away from the recess 28. The pin holding member 515 is held in the first position by engagement between an engagement projection 519 formed on the outer surface (facing the inner surface of the corresponding casing half) of the free end of the first arm 517 and a first engagement recess 520 formed on the inner surface of the corresponding casing half.

When the leader pin 21 is retracted into the recess 28 with the pin holding member 515 held in the first position, the leader pin 21 is brought into abutment against the edge 517a of the first arm 517 and pushes inward the first arm 517, whereby the engagement projection 519 is disengaged from the first engagement recess 520 and the pin holding member 515 is rotated in the counterclockwise direction to the second position shown in FIG. 36. At this time, the engagement projection 519 is brought into engagement with a second engagement recess 521 and holds the pin holding member 515 in the second position. As shown in FIG. 36, in the second position, the arcuate inner edge 518a of the second arm 518 is engaged with the rear side of the flange 21c of the leader pin 21 and holds the leader pin 21 in the recess 28.

It is possible to arrange the pin holding member 515 so that the flange 21c of the leader pin 21 is pinched between the second arm 518 and the wall surface of the recess 28 when the holding member 515 is in the second position.

When the leader pin 21 is drawn by the tape drawing mechanism of the tape drive system, the flange 21c of the leader pin 21 pushes the second arm 518 and disengages the engagement projection 519 from the engagement recess 521, whereby the pin holding member 515 is rotated to the first position where it permits the leader pin 21 to be drawn out from the recess 28.

Figure 38:
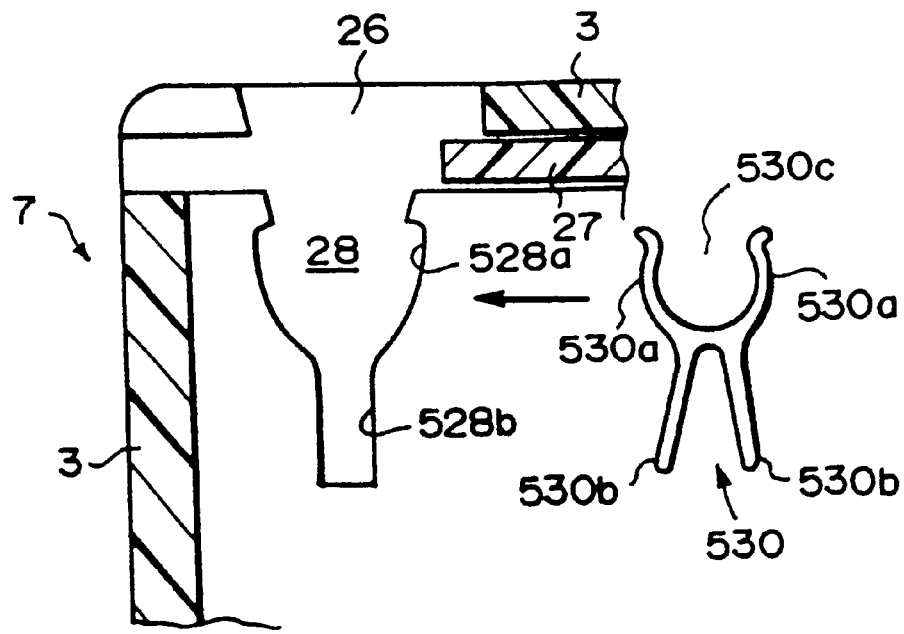
FIG. 38 is a fragmentary cross-sectional view of an important part of the magnetic tape cartridge in accordance with a fourteenth embodiment of the present invention showing a state before the pin holding member is incorporated.
Figure 39:
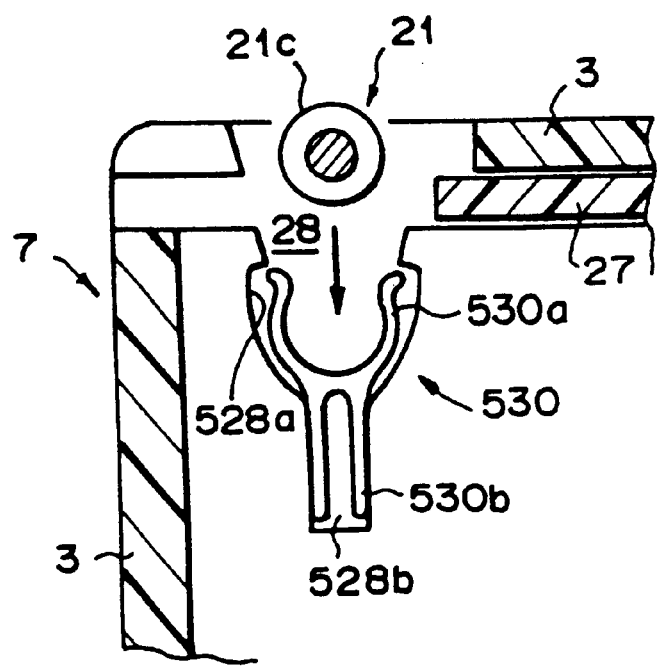
FIG. 39 is a view similar to FIG. 38 but showing the state where the pin holding member is incorporated in the cartridge casing.
Figure 40:
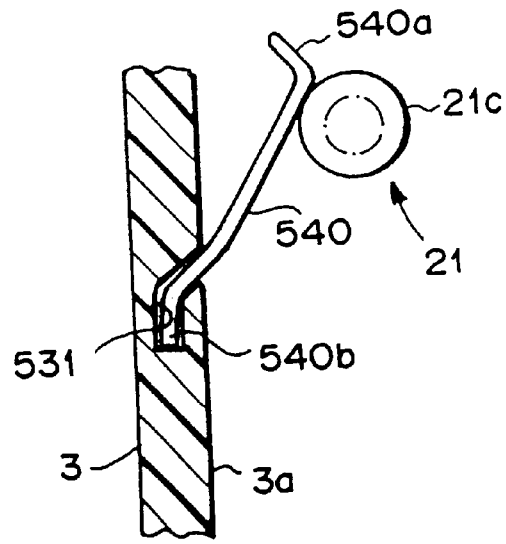
FIG. 40 is a fragmentary view for illustrating a magnetic tape cartridge in accordance with a fifteenth embodiment of the present invention.

In the fourteenth embodiment shown in FIGS. 38 20 and 39, the leader pin 21 is removably held in the recesses 28 formed in the upper and lower casing halves 2 and 3 by a pin holding member 530 disposed in each recess 28.

In the fifteenth embodiment shown in FIGS. 40, 41A, 41B, 42A, and 42B, the leader pin 21 is removably held in the recesses 28 formed in the upper and lower casing halves 2 and 3 by a pin holding member 540 disposed in each recess 28. The pin holding member 540 is in the form of a plate spring formed of metal or hard plastic. The pin holding member 540 has a holding portion 540a similar to that 30b of the first embodiment at its free end and is held in the cartridge casing 7 by press-fitting its base end portion 540b in a cutaway portion 531 formed on the inner surface of the cartridge casing 7 (the inner surface 3a of the lower casing half 3 or the inner surface 2a of the upper casing half 2)

Figures 41A, 41B:
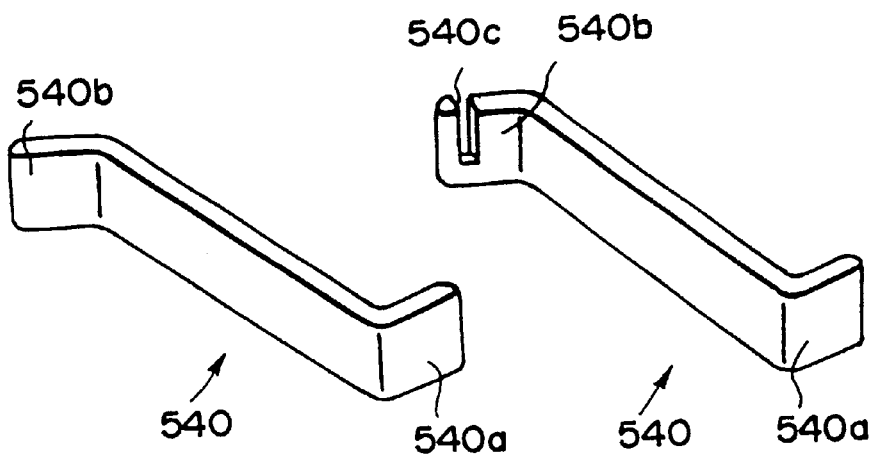
FIG. 41A is a perspective view showing the pin holding member employed in the fifteenth embodiment.
FIG. 41B is a perspective view showing a modification of the pin holding member.
Figure 42A:
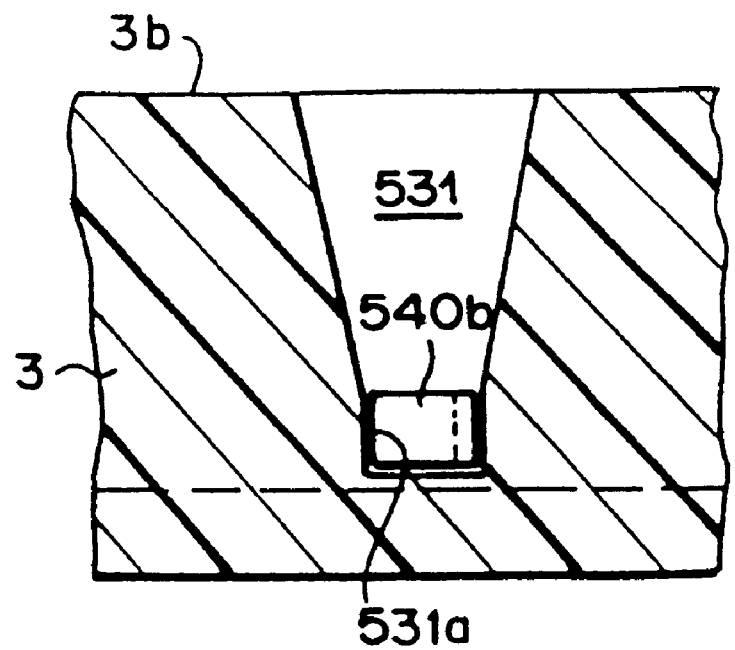
FIG. 42A is fragmentary cross-sectional view showing the base end portion of the pin holding member press-fitted in the cutaway portion of the cartridge casing.
Figure 42B:
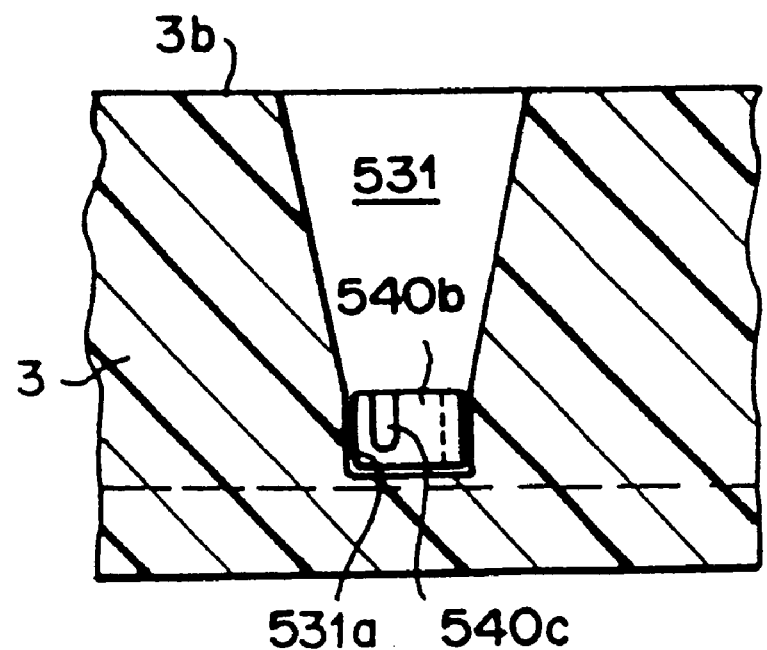
FIG. 42B is fragmentary cross-sectional view showing the base end portion of the modification of the pin holding member press-fitted in the cutaway portion of the cartridge casing.

The cutaway portion 531 extends downward from the upper end face 3b of the lower casing half 3 and the base end portion 540b of the pin holding member 540 is inserted into the cutaway portion 531 from above and press-fitted in the lower end portion 531a of the cutaway portion 531. The cutaway portion 531 is flared upward to facilitate insertion of the base end portion 540b. It is preferred that the base end portion 540b of the pin holding member 540 be provided with a slit 540c so that the base end portion 540b is resiliently press-fitted in the lower end portion 531a of the cutaway portion 531 as shown in FIGS. 41B and 42B.

What is claimed is:
1. A magnetic tape cartridge comprising a cartridge casing, and a single reel around which a magnetic tape with a leader pin fixed to the leading end thereof is wound and which is contained in the cartridge casing for rotation,
wherein the improvement comprises a pin holding member which is supported for rotation on a shaft and is rotatable between a first position where the leader pin is permitted to be removed from the cartridge casing and a second position where the pin holding member is in abutment with the leader pin and holds the leader pin in a predetermined position, the pin holding member being rotated from the first position to the second position when the leader pin is retracted into the cartridge casing, and the pin holding member being rotated from the second position to the first position by the leader pin when the leader pin is withdrawn from the cartridge casing.
2. The magnetic tape cartridge as defined in claim 1, wherein the pin holding member comprises an L-shaped lever having a straight first arm and an arcuate second arm.
3. The magnetic tape cartridge as defined in claim 2, wherein the pin holding member further comprises an engagement projection disposed on a free end of the straight first arm, the engagement projection being operative for engagement with either a first engagement recess or a second engagement recess which are formed on an inner surface of the cartridge casing.
4. The magnetic tape cartridge as defined in claim 3, wherein when the pin holding member is in the first position, the leader pin is brought into abutment against an edge of the straight first arm and pushes inwardly against the straight first arm, whereby the engagement projection is disengaged from the first engagement recess and the pin holding member is rotated counterclockwise to the second position.
5. The magnetic tape cartridge as defined in claim 4, wherein when the pin holding member is rotated to the second position, the engagement projection is brought into engagement with the second engagement recess and holds the pin holding member in the second position, whereby in the second position an inner edge of the arcuate second arm is engaged with and holds the leader pin.
6. A magnetic tape cartridge comprising a cartridge casing, and a single reel around which a magnetic tape with a leader pin fixed to the leading end thereof is wound and which is contained in the cartridge casing for rotation,
wherein the improvement comprises a pin holding member which is rotatable between a first position where the leader pin is permitted to be removed from the cartridge casing and a second position where the pin holding member is in abutment with the leader pin and holds the leader pin in a predetermined position, the pin holding member being rotated from the first position to the second position when the leader pin is retracted into the cartridge casing, and the pin holding member being rotated from the second position to the first position by the leader pin when the leader pin is withdrawn from the cartridge casing,
wherein the pin holding member comprises an L-shaped lever having a straight first arm and an arcuate second arm and is supported for rotation on a shaft between the first position and the second position.

* * * * *